(No Model.)

H. G. COX.
CHECK BIT.

No. 437,576. Patented Sept. 30, 1890.

Witnesses,
Geo. H. Strong.
J. H. Nurse

Inventor,
Harris G. Cox
By Dewey & Co.
Attys

UNITED STATES PATENT OFFICE.

HARRIS G. COX, OF SAN JOSÉ, CALIFORNIA.

CHECK-BIT.

SPECIFICATION forming part of Letters Patent No. 437,576, dated September 30, 1890.

Application filed June 13, 1890. Serial No. 355,349. (No model.)

*To all whom it may concern:*

Be it known that I, HARRIS G. COX, a citizen of the United States, residing at San José, Santa Clara county, State of California, have invented an Improvement in Check-Bits; and I hereby declare the following to be a full, clear, and exact description of the same.

My invention relates to an improved check-bit for driving horses; and it consists in certain details of construction, which will be more fully explained by reference to the accompanying drawings, in which—

Figure 1:
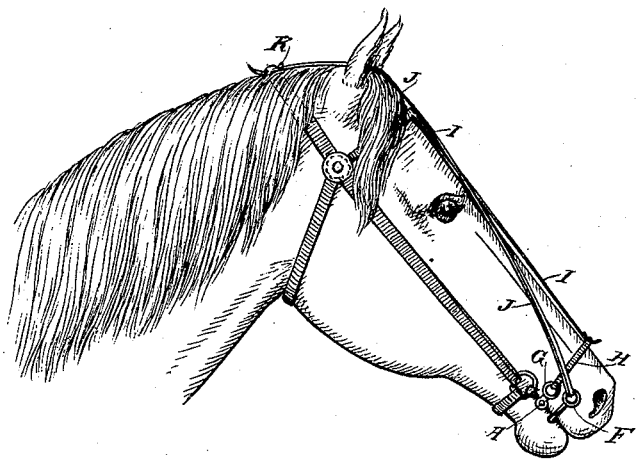
Figure 2:
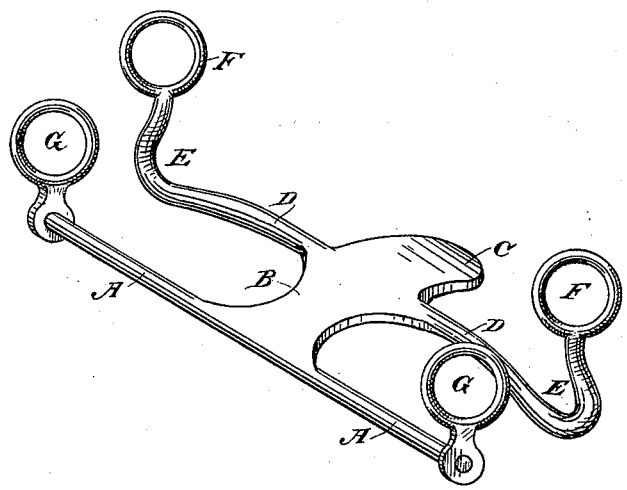
Figure 3:
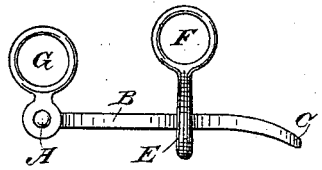

Figure 1 is a view showing the application of the bit and check to the horse's head. Fig. 2 is a perspective view of the bit. Fig. 3 is a side view.

The object of my invention is to provide an improvement in that class of supplemental bits known as "overdraw-checks;" and the especial feature of the invention is the two connected bars of the bit, with swivel attachments for the rear bar and nose-strap connection, which attachments allow the front portion of the bit to drop down and relieve the mouth of the animal from pressure as long as the head is held in the proper position.

A is the rear bar of the bit, which in the present case is shown as a straight round bar of sufficient length to extend through the mouth of the horse from side to side. From the center of this bar a flat plate B extends forward and has the extreme front end or tip turned downward slightly, as shown at C. From the sides of the plate B the bars D extend outwardly, being slightly curved downward toward the outer ends, as shown at E, and thence they are curved upwardly upon each side of the horse's mouth, terminating in the rings F. The plate B C thus lies nearly in the center of the horse's mouth. The bars D, being dropped slightly, as shown at E, at the outer ends, relieve the lips and sides of the jaw of the horse of any pressure from this portion of the bar, and allow the front end of the plate to press upon the roof of the horse's mouth when the plate is dropped.

Upon the ends of the bar A are swiveled the rings or links G, which are adapted to turn easily upon the ends of the bar. To the rings G the ends of the nose-strap H are attached, this strap passing over the top of the horse's nose, as shown, and from the center of this strap a strap I extends up and is connected with the headstall upon the top of the head, so as to hold the nose-strap H in place. From the rings F the strap J extends upward on each side of the horse's face to a point between the eyes and the end of the nose, and from this point it is joined into a single strap or check K, which extends over the top of the horse's head in the usual manner of such checks.

It will be seen that when the horse drops his head the rear portion of the bit A, through the connection of the nose-strap H, forms a fulcrum about which the projecting rings F are moved by the pull upon the strap J, and this lifts up the front portion of the plate B C against the roof of the horse's mouth, thus causing him such inconvenience that he will naturally lift his head into the proper position.

By reason of the swivel-rings G the bar A is allowed to turn at the points where it is journaled in these rings, and as soon as the horse raises his head into the proper position the front portion B C will drop down so as to lie easily within the mouth and cause no pressure or trouble.

It will be understood that this check-bit is supplemental to the ordinary driving-bit, which lies below it in the horses mouth, and it is especially for use upon hard-bitted horses, for those which hold the head down so as to choke themselves and prevent free breathing while traveling.

Having thus described my invention, what I claim as new, and desire to secure by Letters Patent, is—

1. A check-bit consisting of the bar A, the central projecting plate B C, and the bars D, extending to each side of said plate, having the rings F formed at their upturned ends, in combination with the swivel rings or attachments G, journaled upon the ends of the bar A, substantially as herein described.

2. A check-bit consisting of front and rear bars which extend transversely across the horse's mouth, the front bar curved downward where it passes between the lips and having upturned rings at the outer ends, the rear bar having swivel-rings at the outer end, and a central plate uniting the two bars and extending beyond the front bar, with a downward curve at the front, substantially as herein described.

In witness whereof I have hereunto set my hand.

HARRIS G. COX.

Witnesses:
S. H. NOURSE,
H. C. LEE.